Patented Feb. 19, 1929.

1,703,027

UNITED STATES PATENT OFFICE.

ITALO CAVALLI, OF PADUA, ITALY.

DESULPHURIZATION OF PYRITE CINDERS.

No Drawing. Application filed September 27, 1927, Serial No. 222,405, and in Italy October 7, 1926.

It is known that the pyrite cinders form a bulky waste product of the manufacture of sulphuric acid. These cinders, although containing 92–94% of $Fe_2O_3$, cannot be utilized as raw materials in the preparation of iron, owing to their sulphur content which sometimes reach 1.5–3.5%.

In some cases, if their content is low (say about 1.5%) they are mixed in certain quantities with a good iron mineral in the blast-furnaces charge, but always in limited quantities.

Attempts to desulphurize pyrite cinders have been made, with the object of completely utilizing them in the manufacture of iron, but the results obtained were not satisfactory, as may be gathered from the continuous accumulation of said cinders in the neighborhood of the sulphuric acid plants.

It is obvious that this material, after desulphurization, would become a very convenient raw material in the manufacture of iron.

Now, I have found that, by means of a treatment in the wet way it is possible to remove almost all the sulphur, thereby obtaining an oxide of iron suitable for the preparation of a good metal, and more specifically I have found that treating pyrite cinders with a solution of an alkali metal hypochlorite the sulphur contained in the solution is completely oxidized. Consequently it can be removed as a soluble sulphate.

A method for effecting this process is described in the following example, to which, of course, my invention is not limited.

Pyrite cinders, air dried, are first passed through a 0.5 cm. screen to eliminate the larger particles (about 10%) which are also the most sulphurized (with a cinders content of 1.72% of sulphur, the large particles contained 4.43% of S); after this treatment the finer particles are ground to such an extent that they will pass through a French sieve Nr. 150 of 3080 mesh per square centimeter. The dust is then lixiviated with water until the soluble sulphates are completely removed, and then is passed into vessels provided with a stirring apparatus. A series of said vessels is used, the vessels being disposed in closed cycle and united in such a manner that each of them may constitute the first vessel of the series, whilst one or more of said vessels may be excluded from the series.

The first vessel of the series is charged with fresh cinders, the last contains cinders nearly completely desulphurized. Through these vessels an electrolytically obtained solution of sodium hypochlorite containing 15% of active chlorine is circulated, so that the fresh hypochlorite solution enters the last vessel of the series, whose cinders have been in contact with the oxidizing solution during a greater time. In such a manner it is possible to exhaust nearly completely the oxidizing power of the hypochlorite solution. To obtain a practically complete desulphurization of the cinders it is only necessary to follow the lowering in the titre of the active chlorine, and determine the number of the vessels constituting the series, which of course varies according to the quantity of sulphur contained in the cinders.

The desulphurized oxide of iron contained in the vessel which has been excluded from the series of vessels, is allowed to deposit, the liquid is decanted and passed to the purification process and the oxide is repeatedly washed by decantation with water.

The solution which has been decanted from the desulphurized cinders contains, beside sodium chloride, also sulphates. The greatest part of the sulphuric residue is eliminated by means of lime, the last traces by means of $BaCl_2$ and the little excess of calcium and barium salts with $Na_2CO_3$. In such a manner there is again obtained a solution of sodium chloride which can be again used in the preparation of the hypochlorite.

When the cinders which have been treated contain a certain quantity of copper, this, after the treatment above described, will be partly in the solution and partly in the solid residue. The copper in solution is separated by means of iron, and the residue solution is then purified in the above manner. The copper contained in the solid residue can be extracted by means of a solution of ferric chloride, from which the copper is separated by means of iron, removing afterwards the ferric solution.

When, besides the copper a fixed quantity of silver is present, it is also possible to subject the residues to the action of the ammonia.

Such treatment depends upon the quantity of copper or silver which is present.

By treating a cinder containing 1.72% of S, with the process above described there has been obtained an oxide of iron containing only 0.18% of S. Said oxide, after convenient mechanical treatment, was used in the preparation of iron.

What I claim is:—

1. The process of desulphurizing pyrite cinders which comprises treating the cinders with a solution of an alkali metal hypochlorite.

2. The process of desulphurizing pyrite cinders which comprises treating the cinders with a solution of sodium hypochlorite.

In testimony whereof I have hereunto signed my name.

ITALO CAVALLI.